United States Patent [19]

Ruhnau et al.

[11] 4,113,322
[45] Sep. 12, 1978

[54] DIGITAL CONTROL CIRCUIT FOR PRODUCING ACCELERATION AND DECELERATION CONTROL SIGNALS IN AN ANTISKID CONTROL SYSTEM

[75] Inventors: Gerhard Ruhnau; Wolfgang Gudat, both of Hanover; Peter Liermann; Karl-Heinz Hesse, both of Gehrden, all of Fed. Rep. of Germany

[73] Assignee: WABCO Westinghouse GmbH, Hanover, Fed. Rep. of Germany

[21] Appl. No.: 809,886

[22] Filed: Jun. 24, 1977

[30] Foreign Application Priority Data

Jul. 12, 1976 [DE] Fed. Rep. of Germany ....... 2631227

[51] Int. Cl.$^2$ .............................................. B60T 8/08
[52] U.S. Cl. ...................................... 303/105; 303/20
[58] Field of Search ...................... 303/95, 96, 97, 105, 303/20

[56] References Cited

U.S. PATENT DOCUMENTS

| 3,652,135 | 3/1972 | Baumann | 303/20 |
| 3,843,210 | 10/1974 | Portas | 303/97 |

Primary Examiner—Trygve M. Blix
Assistant Examiner—Reinhard J. Eisenzopf
Attorney, Agent, or Firm—R. W. McIntire, Jr.

[57] ABSTRACT

An antiskid control system for a vehicle in which acceleration and deceleration control signals are generated by a control circuit in accordance with the rotational speed of a wheel monitored by a sensor device that produces a pulse train whose frequency varies with wheel speed. A digital counter operates for the duration of each pulse cycle of the sensor signal whereby the pulse count obtained represents a cycle duration of the sensor signal. Within the control circuit to which the sensor signal is supplied, a control unit transfers the pulse count after each cycle to a first shift register as a measure of the cycle duration. The first shift register outputs the pulse count of the measured cycle duration to a comparator to which there is also connected a pulse count of a reference cycle duration supplied by a second shift register to which the pulse count of a previous measured cycle duration has been supplied by the first shift register to form the reference cycle duration. The reference cycle duration and measured cycle durations are compared to obtain a difference signal which is subsequently compared to an admissible difference signal to provide the acceleration and deceleration control signals when the difference exceeds a preselected amount. The admissible difference is formed as a fraction of the reference cycle duration by selecting an output of the second shift register corresponding to a preselected stage thereof.

19 Claims, 3 Drawing Figures

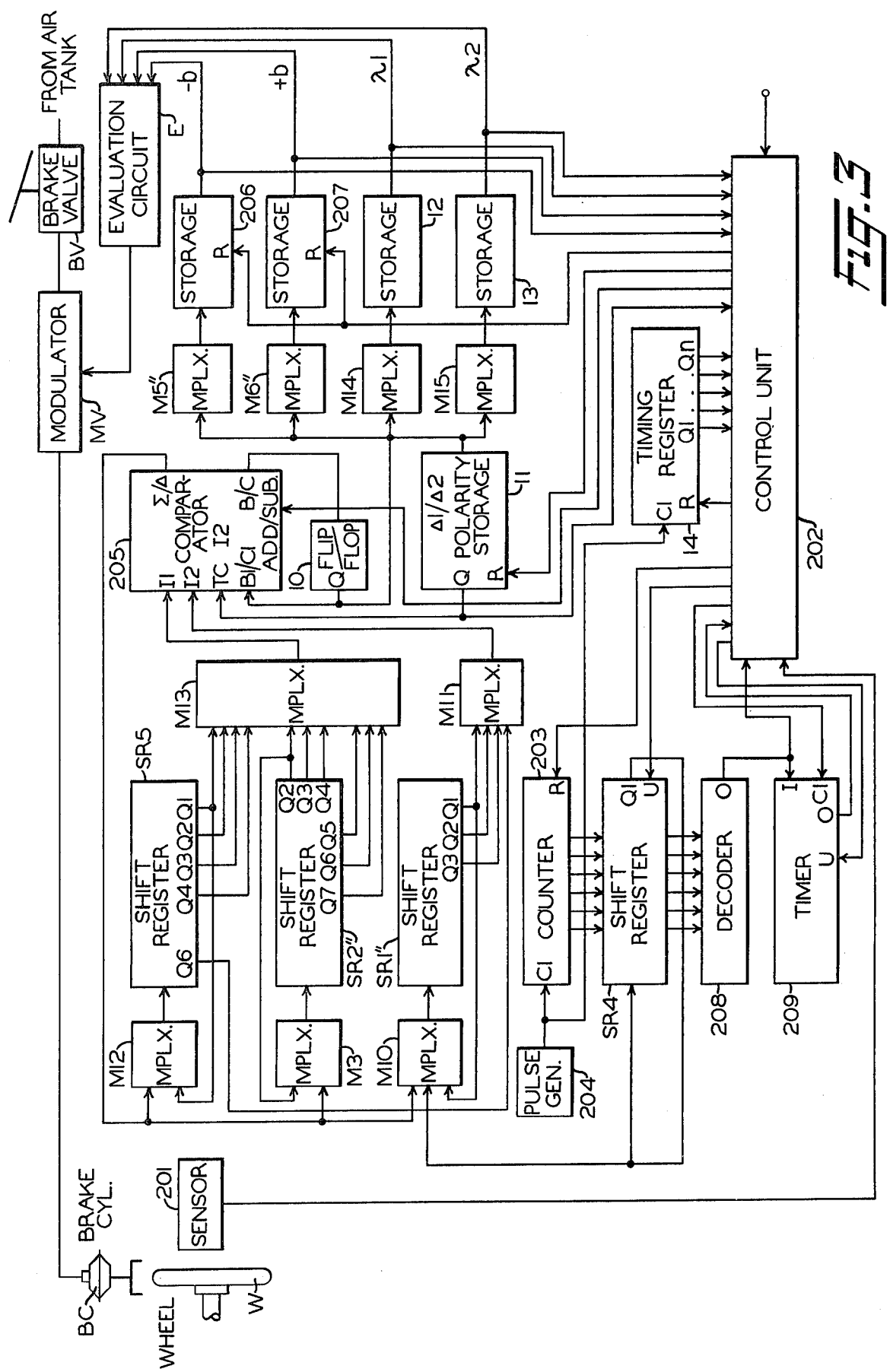

DIGITAL CONTROL CIRCUIT FOR PRODUCING ACCELERATION AND DECELERATION CONTROL SIGNALS IN AN ANTISKID CONTROL SYSTEM

BACKGROUND OF THE INVENTION

The present invention is concerned with an antiskid control system of the type wherein a sensor device monitors the rotational speed of a vehicle wheel to obtain control signals by which an electronic evaluation circuit is able to determine behavioral characteristics of the sensed wheel for the purpose of controlling modulator valves in the brake pressure line in order to regulate brake pressure in accordance with the dynamic wheel condition and accordingly ensure optimum braking.

Known systems of the above type employ a rotor whose teeth are sensed by a sensor device to generate output pulses having a repetition frequency proportional to the speed of rotation of the rotor and thus of the wheel with which the rotor is associated; a converter circuit which produces a d.c. voltage whose amplitude is proportional to the pulse frequency; a differentiator which forms acceleration control signals from the d.c. voltage and a logic circuit which evaluates these control signals in order to properly control the system modulator valves. The system further employs a logarithmic stage between the converter circuit and the differentiator. Since the quantity of the output d.c. voltage of the converter circuit is inversely proportional to the sensor output signal frequency, the logarithmic stage is required to simulate the angular wheel acceleration being monitored. However, when employing digital techniques, the cycle durations of the sensor output signals are not utilized directly but only via conversion to a d.c. voltage, with subsequent logarithmation and differentiation. Accordingly, not only do considerable sources of errors exist, but also considerable expense is entailed when attempting to use such a system in actual practice.

SUMMARY OF THE INVENTION

The object of the present invention, therefore, is to provide an antiskid system of the type discussed above in which a digital method of operation is employed without encountering the disadvantages heretofore existing.

In achieving this objective without resorting to complicated and expensive circuitry for the electronic simulation of wheel speed variation as a function of a measured cycle, the cycle durations of the sensor signals are utilized directly by comparing the instantaneous cycle duration with a reference cycle duration.

The cycle duration $\overline{L}$ of the sensor output signals has the proportionality $\overline{L} = 1/\overline{VK}$ where:

$\overline{L}$ = cycle duration (sec.)
V = speed (km/h)
K = constant (hz/km/h)

The sensor produces an output signal each time a tooth of the rotor associated with a wheel being monitored passes by the pole piece of a stator comprising the sensor device. The time duration of this signal, known as a cycle, thus depends upon the speed of the rotor and thus of the wheel associated with the rotor. The cycle duration is measured in terms of the number of clock pulses counted during the cycle. At high speeds, the cycle duration of the sensor output signal is shorter than at low speeds, so that a lower pulse count is obtained as wheel speed increases and vice versa. The inverse proportionality given by the foregoing formula is thus apparent.

The present invention is based upon the assumption that where the duration of cycle $\overline{L}_n$ exceeds the duration of a preceding cycle, herein called a reference cycle $\overline{L}_B$, by a preselected factor, the vehicle wheel is considered to be in an incipient wheel skid stage, commonly referred to as wheel slip, in response to which condition an antiskid control signal is to be produced. This preselected factor is known as the response threshold.

Over the effective range of cycle durations measured between low and high wheel speeds, there exists a considerable difference between the measured count representing a cycle duration, e.g. 50,000. When presetting certain constant response thresholds, the analysis of the difference would be related to the fixing of many coding points to determine the admissible difference. In order to keep the number of coding points within technically feasible limits, the first cycle duration $\overline{L}_1$ is, according to the invention, selected as the reference cycle duration $\overline{L}_B$ and is divided by a preselected value m.

As a further consideration, however, m may be selected as a variable rather than a fixed value. At higher wheel speeds, for example, a wheel skid may be considered more critical than at lower speeds, in which case it may be desirable to reduce the admissible difference between the effective cycle duration and the reference cycle duration. This can be accomplished by varying the factor m according to the effective speed range as ascertained periodically so that m is greater in the higher speed ranges than the lower speed ranges.

As a further example, when the monitored wheel exceeds the deceleration threshold, a belated response of the device for producing a deceleration control signal $-b$ will result in an extended antiskid control period necessary to recover synchronous control of the wheel. By increasing or decreasing the value of m in accordance with the length of time the deceleration signal $-b$ is produced, the admissible difference between the momentary cycle duration and reference cycle duration may be shortened or lengthened accordingly, thereby adjusting the duration of the antiskid control period.

As a further possibility, factor m may be varied in accordance with slip control signals indicative of wheel speeds being within certain predetermined slip ranges below a reference velocity. If the wheel speed fails to fall within a first slip range $\lambda_1$, then the value of m must be reduced to increase the admissible difference between the momentary cycle duration and the reference cycle duration, thereby allowing the wheel to reach a lower deceleration threshold before the deceleration signal $-b$ is produced. If the wheel speed exceeds a second slip range $\lambda_2$ below slip range $\lambda_1$, then factor m must be increased to decrease the admissible difference between cycle durations.

The cycle duration $\overline{L} = \overline{L}_1(1 + 1/m)$ is chosen as the response threshold (a) for the deceleration signal $-b$, $\overline{L}_1$ being the reference cycle duration. Each cycle duration $\overline{L}_n$ within the monitoring time is compared with $\overline{L}_1$ $(1 + 1/m)$. Thus, if during the monitoring time the cycle duration $\overline{L}_n$ is smaller than $\overline{L}_1 (1 + 1/m)$, the response threshold is not exceeded and therefore no control signal $-b$ is emitted. The reference cycle duration is then chosen anew, in which case the final cycle duration within the monitoring period or the first cycle duration in the next monitoring period is employed as the new reference cycle duration.

In the case of an acceleration control signal $+b$, only the polarity of factor $m$ is changed.

BRIEF DESCRIPTION OF THE DRAWINGS

In the drawings to which the following more detailed explanation refers:

FIG. 3 shows a further refinement of the system of FIG. 1 in order to provide velocity slip control signals in addition to deceleration and acceleration signals.

DESCRIPTION AND OPERATION

Figure 1:
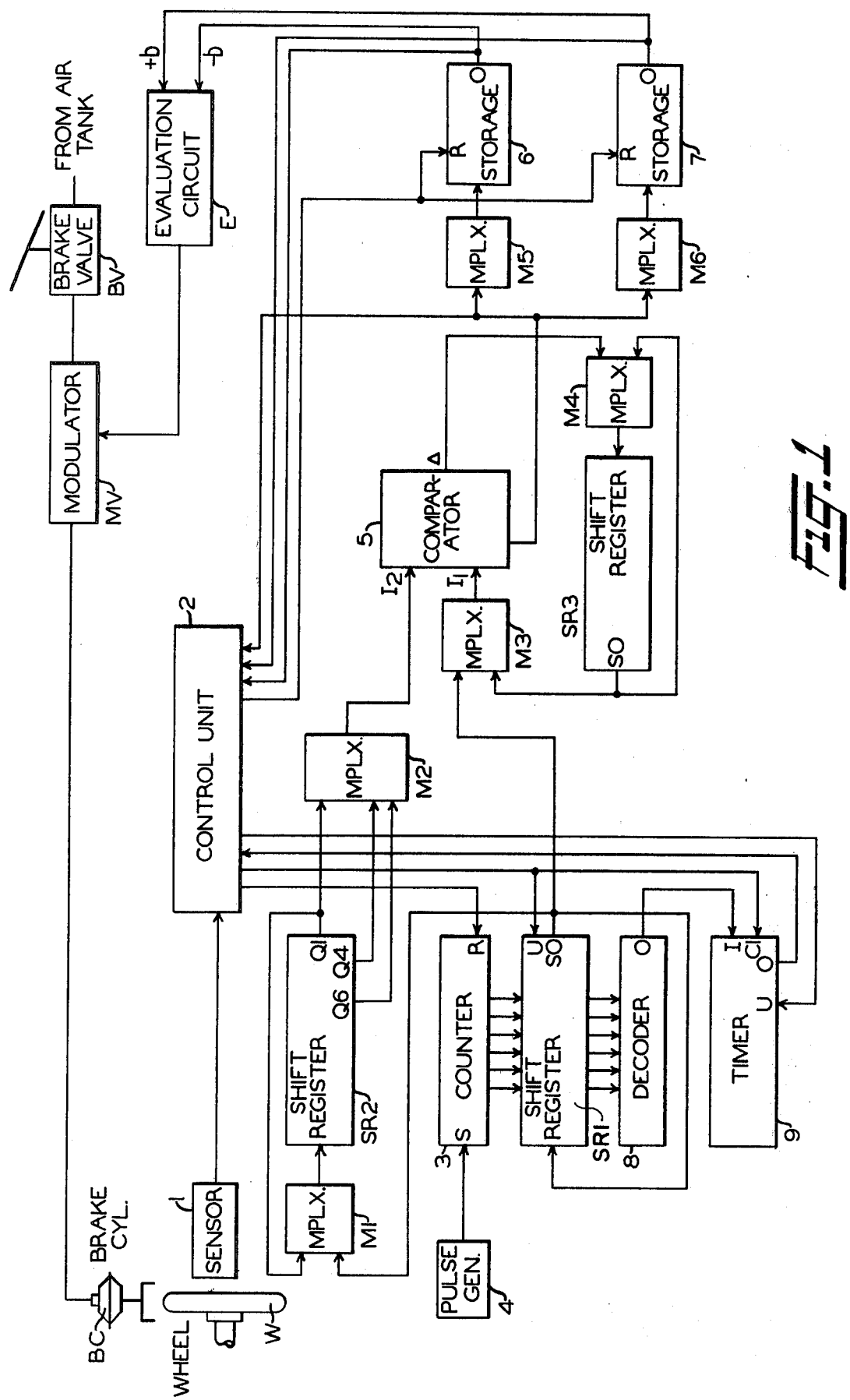
FIG. 1 shows a block diagram of the system of the invention for providing wheel deceleration and acceleration signals in accordance with the dynamic behavior of a wheel being monitored.

According to FIG. 1, there is shown a wheel W having associated therewith a brake cylinder device BC to which a source of fluid pressure may be supplied via an operator's brake valve device BV. A modulator valve unit MV is located between the brake valve device BV and brake cylinder BC to control brake cylinder pressure independent of the brake valve device in accordance with control signals received from an evaluation circuit E. Electronic circuitry providing the improvement upon which the present invention is based includes a sensor 1 that monitors dynamic wheel behavior conditions of wheel W and produces appropriate outputs to evaluation circuit E.

Sensor 1 produces a pulse-shaped voltage whose pulse repetition frequency is proportional to the speed of wheel W. At the beginning of each cycle of the pulse-shaped sensor output voltage, a control unit 2 resets for a short moment a counter 3, which then counts the pulses supplied by a pulse generator 4 to the counter 3 during the time of one cycle of the sensor output voltage. At the end of each cycle, the count result obtained is transferred to a shift register SR1 by means of a transfer signal of the control unit 2. According to predetermined conditions, certain count results are transmitted as reference quantities to another shift register SR2 via a multiplexer M1, which will be further elaborated on hereinafter. The counter 3 then supplies to shift register SR1 a new numerical quantity which corresponds to a cycle that follows the first cycle. The numerical quantities present in shift registers SR1 and SR2 are supplied, via multiplexers M3 and M2, to a subtractor 5 whose function is initially to form a differential value from the numerical quantities. The numerical quantity present in shift register SR1 is taken as a measured cycle duration $\bar{L}_n$, the numerical quantity present in shift register SR2, as a reference cycle duration $\bar{L}_B$. The differential value so computed is transmitted from a subtractor 5, via a multiplexer M4, to a shift register SR3. This numerical quantity now present in shift register SR3 is indicated by $\Delta$. Shift register SR2 has three output terminals Q1, Q4 and Q6, which are connected to the multiplexer M2. The first numerical quantity supplied by shift register SR2 via the output Q1 corresponds to the reference cycle duration $\bar{L}_B$, which — as already stated — is taken as a reference quantity to ascertain the differential value, by which the comparison cycle duration $\bar{L}_n$ is allowed to differ from the reference cycle duration $\bar{L}_B$, without a control signal being produced. In order to be able to determine the permissible magnitude of said differential value, the numerical quantity present in shift register SR2 is divided by a determinable value $m$. The new numerical quantity $\bar{L}B/m$ so obtained is transmitted via output Q4 to multiplexer M2 and thence to subtractor 5 via multiplexer M3, the numerical quantity $\Delta$ is transmitted from shift register SR3 likewise to the subtractor 5. Following its initial computation for determining $\Delta$, subtractor 5 then subtracts the numerical quantity $\Delta$ from the numerical quantity $\bar{L}B/m$. If the numerical quantity $\Delta$ is greater than the numerical quantity $\bar{L}B/m$, the subtractor 5 supplies a signal which is delivered, via a multiplexer M5, to a storage unit 6 for $-b$ control signals. In order to determine whether the wheel speed has reached a value which makes the setting of a $+b$ control signal necessary, the value of the reference cycle duration is "divided" in the shift register SR2 by a second value $m_2$, which may be greater or smaller than the first value $m_1$ (for instance, it may happen that $m_1 = 16$, $m_2 = 32$). The value thus obtained $\bar{L}B/m_2$ is also transmitted, via multiplexer M2 to subtracter 5. The subtracter compares this value $\bar{L}B/m_2$ again with the value $\Delta$ and, if $\Delta$ is greater than $\bar{L}B/m_2$, delivers via a multiplexer M6 a signal to a storage 7 for the provision of a $+b$ control signal.

The control unit 2 determines whether a $-b$ control signal or a $+b$ control signal is to be supplied. This takes place in the following manner:

As already described hereinbefore, the numerical quantities $\bar{L}_B$ and $\bar{L}_n$ are transmitted from the shift registers SR1 and SR2 to subtracter 5. The subtracter carries out the initial computation $\Delta = \bar{L}_B - \bar{L}_n$. The sign polarity of $\Delta$ is stored in control unit 2 via an output of subtracter 5. When there is a negative sign, a computation is carried out with respect to a $-b$ control signal and if there is a positive sign, a computation is carried out with respect to a $+b$ control signal.

The reference cycle durations provided for comparison may be determined in various ways.

Examples are given below:

As shown, the shift register SR1 may be associated with a decoder 8, which accepts the numerical quantity present in counter 3 and decodes it in such a form that it determines which cycle duration range representing wheel speed this numerical quantity is to be assigned to; i.e., it determines with how many subsequent numerical quantities this numerical quantity can be compared, before it becomes necessary to form a new reference cycle duration. This information is then transmitted from the decoder 8 to an input I of a device 9 for determining the number of cycles. The device 9 for determining the number of cycles contains a count-down device whose count result is reduced, by single unit increments via an input C1, at the beginning of each cycle, by means of a pulse provided by the control unit 2. When the count-down device has counted down to zero there occurs on the output terminal O of device 9 a "high signal" which is transmitted to the control unit 2. A transfer signal is then produced by control unit 2 and transmitted to a third input U of device 9, resetting device 9 to a new number which — as already stated — depends upon the cycle duration range recognized by the decoder. The outputs of the storages 6 and 7 are connected, on the one hand, with evaluation circuit E, for controlling modulator valve unit MV, which influence the wheel brake pressure and, on the other hand, with control unit 2. When there occurs an output signal at one of the two storages 6, 7, it thus also reaches control unit 2 and causes the control unit 2 to influence device 9 in such a manner that the count-down device thereof is set directly to 1. Consequently, a predeterminable number $n$ of cycles $\bar{L}$ is no longer compared with a reference cycle $\bar{L}_B$, but each cycle $\bar{L}_n$ becomes initially a reference cycle and is compared exclusively with one following cycle $\bar{L}_{n+1}$, which after this comparison then becomes in turn a reference cycle. $\bar{L}_n$ is compared with $\bar{L}_{n+1}$; $\bar{L}_{n+1}$ is then compared with $\bar{L}_{n+2}$, etc. Only when the $\Delta$ computed by subtracter 5 changes its sign polarity does control unit 2 deliver a resetting signal to the input R of the corresponding storage 6 or 7. There is now no longer a signal at the output of the relative storage 6 or 7, so that control unit 2 does not supply a corresponding signal to the device 9. Accordingly, device 9 again selects and determines the number of cycles $\bar{L}_n$ a reference cycle $\bar{L}_B$ is to be compared with. Besides the assigning of values to the signs of the difference between cycle durations immediately following one another, a number of cycle duration values which are dependent on the respective cycle duration range, need not be taken into account, which may be advantageous in the upper speed range. It is then also possible to bring into the process the mean value from the cycle durations, which are not taken into account, to form the differences.

It is also possible according to the invention to set the control unit 2 in such a manner that the storages 6, 7 are reset not at each sign change of the $\Delta$ but, for instance, at each third sign change.

According to another form of the invention it is possible to dispense with a separate shift register for the $\Delta$ signal. In this case the $\Delta$ signal is transmitted to the shift register SR1 which contains the cycle duration value $\bar{L}_n$ at the beginning of the computation.

Figure 2:
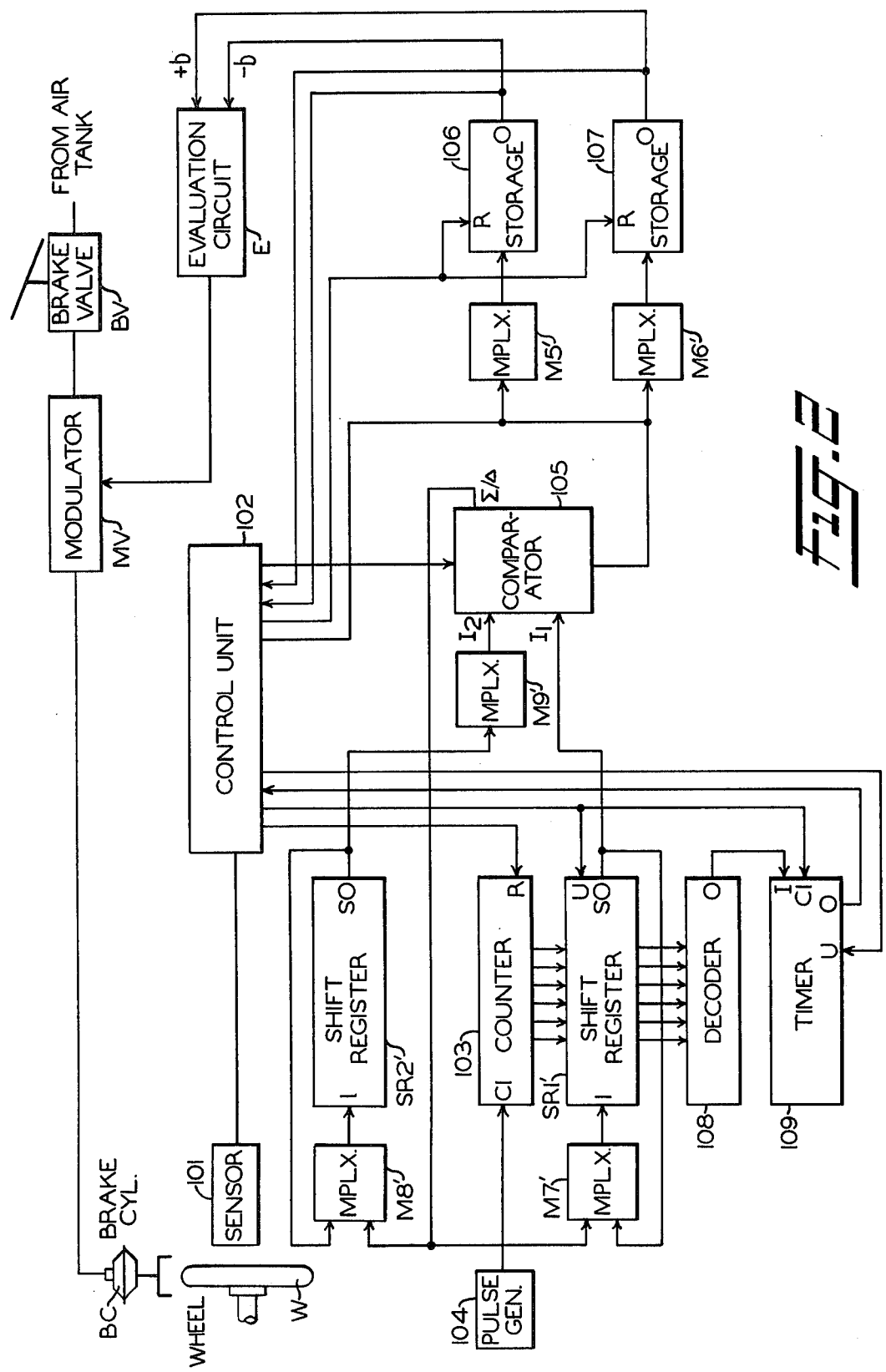
FIG. 2 shows a simplified embodiment of the system shown in FIG. 1.

A circuit arrangement thus simplified is shown in FIG. 2. For more clarity, components which are identical with the components already shown in the circuit arrangement of FIG. 1, are provided with identical reference numerals increased by 100 or by a prime mark associated with the reference numeral.

A sensor 101 produces a voltage with a pulse repetition frequency which corresponds to the instantaneous wheel speed. A control unit 102 connected with the output of sensor 101 initiates, at the beginning of a cycle of the pulse-shaped sensor output voltage, a count of the pulses supplied by a pulse generator 104 to a counter 103. At the end of each count, the result obtained is transferred to a shift register SR1' by means of a transfer signal of the control unit 102. The shift register SR1' has an output SO which is connected, on the one hand, with an input $I_1$ of a subtracter/adder 105 and, on the other, via a multiplexer M7', with an input I of the shift register SR1'.

The output SO of shift register SR2' is connected, via the multiplexer M8', with the input I of the shift register SR2' and, via a multiplexer M9', with another input $I_2$ of the subtracter/adder 105. In the subtracter/adder 105 there is first formed the difference between the numerical quantity provided by the shift registers SR1' and SR2', the numerical quantity provided by the shift register SR1' corresponding to the momentary cycle duration and the numerical quantity provided by the shift register SR2' corresponding to a preceding cycle duration. The differential value ascertained by the subtracter/adder 105 is indicated by $\Delta$. The differential value $\Delta$ is transmitted by the subtracter/adder 105, via multiplexer M7', to the input I of shift register SR1'. Since initially there is no output at SR2', the differential value $\Delta$ = the output value of SR1', which is subsequently fed to SR2' as the initial reference cycle duration $\bar{L}_B$. By supplying the differential value $\Delta$ to input I of shift register SR1', the previous numerical quantity $\bar{L}_n$ present till then in the shift register SR1' is cleared ($\bar{L}_n$ is the value for the cycle duration which is present momentarily).

The numerical quantity $\bar{L}_B$ ($\bar{L}_B$ = reference cycle duration) present in the shift register SR2' is divided by a selectable value $m$, e.g. 8, so as to obtain a differential quantity by which the momentary cycle duration $\bar{L}_n$ is allowed to differ from the reference cycle duration $\bar{L}_B$, in order to prevent a control signal $-b$ from being generated. In order to be able to carry out the division $\bar{L}_B/m$, pulses arrive three to five cycles earlier in SR2' than in SR1', wherein the differential value is present up to this moment. The information units in shift registers SR1' and SR2' cycle. Since the lowest bit of SR2' is in the right position three to five cycles earlier, the multiplexer M9' ensures that there is also a "low" signal at input $I_2$ of subtracter/adder 105 when the least significant bit is "high". This negates computation of the three or five highest bits by the shift register SR1'. In order to make it possible that the numerical quantity — which is cleared when computing the value $\Delta$ — of the cycle duration $\bar{L}_n$ still becomes the new numerical quantity of the reference cycle duration $\bar{L}_B$, the differential value $\Delta$ is added to the contents of shift register SR2'.

FIG. 3 shows a further development of the circuit arrangement of FIG. 2 which makes it possible to form additional slip control signals $\lambda 1$ and $\lambda 2$ from the cycle durations $\bar{L}_B$ and $\bar{L}_n$, in addition to the $-b$ and $+b$ control signals. The part of the circuit used to obtain $-b$ and $+b$ control signals is essentially the same as the circuit arrangement of FIG. 2. For more clarity, the components which are identical with the components described and shown in FIG. 2, are indicated by numerals which are increased by 200 or by two vertical strokes.

A sensor 201 produces a voltage having a pulse repetition frequency which corresponds to the instantaneous wheel speed. At the beginning of a cycle of the pulse-shaped sensor output voltage, a control unit 202 connected to the output of the sensor 201 initiates a count of the pulses supplied by a pulse generator 204 to a counter 203. At the end of each count the result obtained is transferred by a transfer signal of the control unit 202 to a shift register SR4 which in this circuit arrangement has the function of an intermediate storage. Via a multiplexer M10 the numerical quantity corresponding to the count result is transmitted from an output Q1 of the shift register SR4 to a shift register SR1". The shift register SR1" has three outputs Q1, Q2, Q3 which are connected with an input $I_2$ of a subtracter/adder 205 via a multiplexer M11. The total numerical quantity present in the shift register SR1" can be taken from the output Q1. Fractions of this numerical quantity can be taken from the outputs Q2 and Q3. An output of subtracter/adder 205 is connected, via a multiplexer M12, with the input of another shift register SR5 which has five outputs Q1, Q2, Q3, Q4 and Q6, the output Q1 serving here also to provide the total numerical quantity and the outputs Q2 to Q6 serving to provide fractions of this numerical quantity. The outputs Q1 to Q6 of shift register SR5 connected, via a multiplexer M13, with an input $I_1$ of subtracter/adder 205, which has the function of forming the difference between the numerical quantity provided by the shift register SR1" and the numerical quantity provided by the shift register SR2", as well as by the shift register SR5. Differential values $\Delta_1$ and $\Delta_2$ are transmitted to the shift register SR1". The control unit 202 determines whether and with how many fractions of the numerical quantities present in the shift registers SR5, SR2" and SR1" a difference is to be formed. In order to recover, after a difference formation, the original numerical quantity for $\overline{L}_n$ for further arithmetical operations, it is possible, in the subtracter/adder 205, to add the contents of shift register SR1" to the contents of shift register SR5. The polarity of the difference quantity is transmitted, via a transfer flip-flop 10, to a polarity storage unit 11, whose output Q is connected, on the one hand, with an input TC $I_2$ of the subtracter/adder 205 and, on the other, with the control unit 202. A multiplexer M14 connects the output Q of the transfer flip-flop 10 with a signal storage 12 for the $\lambda_1$ signals and a multiplexer M15 establishes the connection between the output Q of the transfer flip-flop 10 and a signal storage 13 for the $\lambda_2$ signals. Both the storages 206, 207 and the storages 12, 13 are connected with their outputs to the control unit 202 and evaluation circuit E of the electronic antiskid circuitry. The input C1 of a timing register 14 is connected to pulse generator 204, its outputs Q1 to $Q_n$ being connected to control unit 202. When a signal occurs at modulator valve unit MV''', timing register 14 is reset for a short moment via a reset input R, in order to begin a new count during the time duration of the signal which actuates the solenoid inlet valve.

The functioning of the circuit arrangement for producing $-b$, $+b$, $\lambda_1$ and $\lambda_2$ control signals is further explained hereinafter.

During a braking effort, sensor 201 produces a voltage having a pulse repetition frequency which corresponds to the wheel speed, which voltage is transmitted to control unit 202. At the beginning of each cycle of the pulse-shaped sensor output voltage, control unit 202 initiates a count of the pulses supplied by pulse generator 204 to counter 203. The control unit 202 provides, after the negative edge of each pulse, successively, a possible transfer signal for the device 209, a transfer signal for the shift register SR4 and a reset signal for the counter 203. The decoder 208 assigns one of the cycle duration ranges to the numerical quantity accepted by the shift register SR4. The count-down device located in device 209 is operated after the positive edge of each pulse. When reaching the count result "0", the count-down device is set, after the next negative edge, at a number which is dependent upon the cycle duration range assigned. In addition, the reference cycle duration $\overline{L}_B$ is reestablished at an appropriate moment.

As explained with reference to FIG. 2, the reference cycle duration $\overline{L}_B$ is compared with the momentary cycle duration $\overline{L}_n$ in the subtracter/adder 205. When the momentary cycle duration $\overline{L}_n$ differs from the reference cycle duration $\overline{L}_B$ by more than a predetermined value, subtracter/adder 205 supplies, via transfer flip-flop 10 and multiplexer M5" or M6", a deceleration control signal ($-b$) or an acceleration control signal ($+b$) to the storages 206 or 207.

The cycle duration value $\overline{L}_n$ that is initially present in shift register SR4 and which is used to form the first reference cycle duration value, is also used to form the reference cycle duration that corresponds to the vehicle speed. In order to distinguish it from the reference cycle duration $\overline{L}_B$ resulting from the rotational speed of the vehicle wheel, the vehicle speed reference cycle duration is indicated hereinafter by $\overline{L}_{Ref}$.

To this effect the following necessary steps are carried out:

The numerical quantity present in the shift register SR4 is transferred to the shift register SR1" as long as the control unit 202 fails to supply a transfer signal to the input U of the shift register SR4. This numerical quantity, which corresponds to the momentary cycle duration $\overline{L}_n$, is transmitted from shift register SR1" to subtracter/adder 205. The shift register SR2" supplies, via multiplexer M13, the value which corresponds to the reference cycle duration $\overline{L}_B$, likewise to the subtracter/adder 205. The subtracter/adder 205 forms the difference between the reference cycle duration $\overline{L}_B$ and the momentary cycle duration $\overline{L}_n$. The computed difference value indicated by $\Delta_1$ is transmitted, via the multiplexer M10, to the shift register SR1" where it is kept available for the purpose of providing the total numerical quantity $\Delta_1$ or fractions of the numerical quantity $\Delta_1$ for further computations. The polarity of the difference signal is stored in the polarity storage unit 11. The actual difference $\Delta_1$ is compared with the admissible difference $\overline{L}B/m$ obtained by dividing the reference cycle duration value $\overline{L}_B$ with the fractional values at outputs Q2, Q3, Q4 etc. of the shift register SR2". If the actual difference is greater than the admissible difference, a $-b$ or $+b$ control signal is produced, as already described hereinbefore.

In order to recover the numerical quantity $\overline{L}_n$ for the computation of slip signals, the contents of the shift register SR1" is again added in subtracter/adder 205 to the contents of the shift register SR2" ($\Delta_1 + \overline{L}_B = \overline{L}_n$) and stored in the shift register SR1". It is also possible to supply the contents of the shift register SR4 to the shift register SR1" to again obtain the momentary cycle duration value $\overline{L}_n$.

When the count-down device contained in the device 209 has counted down to "0", or a $-b$ or $+b$ control signal has been issued, a new reference cycle duration value is set. This can be effected on the one hand by supplying the sum of shift registers SR1" and SR2" into shift register SR2" or, on the other hand, by supplying the contents of shift register SR4 to the shift register SR2".

The numerical quantity $\Delta_1$ present in the shift register SR1" is transmitted, via multiplexer M11, to the input $I_2$ of subtracter/adder 205, the numerical quantity $\overline{L}_{Ref}$ present in the shift register SR5 being transmitted, via the multiplexer M13, to the input $I_1$ of the subtracter/adder 205. The difference between $\overline{L}_{Ref}$ and $\overline{L}_n$ is formed in the subtracter/adder 205. This differential value $\Delta_2$, as computed, is stored in shift register SR1", while the signal polarity resulting from the differential value formation is stored in polarity storage unit 11. Subsequently, the differential value from the admissible difference $\overline{L}_{Ref}/m$ and the actual difference $\Delta_2$ is formed in subtracter/adder 205. The admissible differential value is obtained from the division of $\overline{L}_{Ref}$ by $m_2$. In the exemplified embodiment as shown, $m$ is provided by outputs Q1 to Q6 of shift register SR5.

When $\Delta_2 > \overline{L}_{Ref}/2^{n2}$, storage unit 13 is set via output B of subtracter/adder 205, transfer flip-flop 10 and the multiplexer M15.

Thereupon, the value $\overline{L}_{Ref}/2^{n1}$, which corresponds to a smaller preset slip threshold, is subtracted in the subtracter/adder 205, from the actual difference $\Delta_2 = \overline{L}_{Ref} - \overline{L}_n$. When $\Delta_2 > \overline{L}_{Ref}/2^{n1}$, storage unit 12 is set via multiplexer M14. This computational step may, however, be omitted if in the preceding computational step the condition $\Delta_2 > \overline{L}_{Ref}/2^{n2}$ is met, i.e., the condition for the greater slip threshold ($\lambda_2$) is met.

If the timing register 14, which operates during the time a signal is present at modulator valve MV, has been reset during the course of the computational step, the contents of the shift register SR5 ($\overline{L}_{Ref}$) is added to $\overline{L}_{Ref}/2^n$ for the purpose of referencing and is stored in the shift register SR5 as a new reference cycle duration value. The time intervals produced by the timing register are chosen as a function of the cycle duration range, that is, the time intervals are chosen to be longer in the upper speed range than in the lower speed range.

As the vehicle wheel begins to rotate again following a dumping of brake cylinder pressure, the reference cycle duration value $\overline{L}_B$ becomes smaller, so that it is necessary to reduce also the reference cycle duration value $\overline{L}_{Ref}$, which corresponds to the approximate vehicle speed. This is effected by adding the contents of shift register SR1″ ($\Delta_2$) with the contents of shift register SR5 ($\overline{L}_{Ref}$) and storing the sum in shift register SR5 ($\overline{L}_{Ref}$).

Having now described the invention, what we claim as new and desire to secure by Letters Patent, is:

1. A vehicle antiskid control system including a brake cylinder, an operator's brake valve device, a conduit connecting said brake cylinder and said brake valve device via which fluid brake pressure is supplied to said brake cylinder from a source and released from said brake cylinder, a modulator valve unit in said conduit between said brake cylinder and said brake valve device for influencing the fluid brake pressure independently of said brake valve device, a wheel sensor for generating a pulse signal having a frequency proportional to the speed of the wheel with which said sensor is associated, circuit means operative responsive to said pulse signal for producing acceleration and deceleration response control signals; and an evaluation circuit subject to said control signals for effecting operation of said modulator valve unit, said circuit means comprising the improvement of:
   (a) means for measuring the duration of a cycle of said pulse signal comprising:
      (i) means for generating a clock signal of higher frequency than said pulse signal; and
      (ii) a digital counter subject at its input to said clock signal, said counter being periodically reset in synchronism with said pulse signal whereby said clock pulses are counted for the duration of a cycle of said pulse signal to provide a count signal representing the measured cycle duration;
   (b) means for establishing a reference cycle duration from said measured cycle duration of a previous pulse signal; and
   (c) means for providing said control signals when the difference between said reference cycle duration and said measured cycle duration of an immediate pulse signal exceeds said reference cycle duration by a predetermined admissible amount.

2. An antiskid control system as recited in claim 1 wherein said reference cycle duration corresponds to the rotational speed of the wheel associated with said sensor.

3. An antiskid control system as recited in claim 1, wherein:
   (a) said means for providing the measured cycle duration further includes a first shift register in which said count signal is periodically stored; and
   (b) said means for providing the reference cycle duration includes a second shift register to which the count signal representing the cycle duration of a preceding pulse signal is connected from said first shift register to provide said reference cycle duration.

4. An antiskid control system as recited in claim 3, wherein said circuit means for providing said acceleration and deceleration control signals includes circuit means for initially comparing the count signals representing said measured cycle duration and said reference cycle duration to form a difference signal and for subsequently comparing said difference signal with a signal representing the admissible difference to form said control signals.

5. An antiskid control system as recited in claim 4, wherein said circuit means for providing said acceleration and deceleration control signals further includes polarity sensitive means for providing said acceleration control signal when said difference signal is a certain polarity incident to said reference cycle duration exceeding said measured cycle duration and for providing said deceleration control signal when said difference signal is a polarity opposite said certain polarity incident to said measured cycle duration exceeding said reference cycle duration.

6. An antiskid control system as recited in claim 3, wherein said circuit means for providing said acceleration and deceleration response control signals comprises:
   (a) a digital subtracter circuit having first and second inputs, a first output providing a difference signal according to the difference between said measured and said reference cycle durations and a second output providing said control signals;
   (b) first multiplex circuit means for time sequencing connection of said count signal stored in said first shift register and subsequently said difference signal with a first input of said subtracter;
   (c) said second shift register having one output providing said count signal of said reference cycle duration and at least one other output providing a signal representing the admissible difference; and
   (d) second multiplex circuit means for time sequencing connection of said signals at said one and said at least one other output of said second shift register with a second input of said subtracter circuit, whereby said difference signal is initially formed from the comparison of said measured cycle duration and said reference cycle duration and said difference signal is subsequently compared with said admissible difference signal.

7. An antiskid control system as recited in claim 6, wherein said at least one other output of said second shift register provides said admissible difference signal as a predetermined fraction of said count signal of said reference cycle duration.

8. An antiskid control system as recited in claim 3, wherein the improvement further comprises means for maintaining said reference cycle duration constant over a predetermined number of cycles of said pulse signal, said predetermined number of cycles being predicated on the vehicle speed range.

9. An antiskid control system as recited in claim 8, further characterized in that said predetermined number of cycles during which said reference cycle duration is held constant increases with increases in the vehicle speed range.

10. An antiskid control system as recited in claim 9, wherein said means for maintaining said reference cycle duration constant includes:
   (a) said first shift register receiving said pulse count from said counter after termination of each cycle of said pulse signal;
   (b) a decoder subject to the pulse count registered by said first shift register each cycle of said pulse signal for assigning a value to the contents of said first shift register; and
   (c) timing means subject to said decoder for establishing a time interval according to the assigned value of said first shift register by said decoder, during which time interval said reference cycle duration remains unchanged.

11. An antiskid control system as recited in claim 10, wherein said means for maintaining said reference cycle duration constant further comprises means for nullifying operation of said timing means in response to the presence of said control signals.

12. An antiskid control system as recited in claim 3, wherein:
   (a) said means for providing the measured cycle duration further includes a first shift register in which said count signal is periodically stored;
   (b) said means for establishing a reference cycle duration includes a second shift register having an output corresponding to the duration of a preceding cycle of said pulse signal; and
   (c) said means for providing said control signals comprises:
      (i) means for comparing the outputs of said first and second shift registers to provide at a first output a difference signal representing the difference therebetween and at a second output said control signals, said difference signal being connected to said first shift register to replace at the output thereof said count signal representing said measured cycle duration; and
      (ii) means associated with said second shift register for providing at the output thereof a signal representing the predetermined admissible difference as a chosen fraction of said reference cycle duration.

13. An antiskid control system as recited in claim 12, further characterized in that said difference signal is connected to said second shift register to adjust the output thereof such that said reference cycle duration corresponds to said measured cycle duration of the preceding pulse signal.

14. An antiskid control system as recited in claim 13, wherein the improvement further comprises means for maintaining said reference cycle duration constant over a predetermined number of cycles of said pulse signal, said predetermined number of cycles being predicated on the vehicle speed range.

15. An antiskid control system as recited in claim 14, further characterized in that said predetermined number of cycles during which said reference cycle duration is held constant increases with increases in the vehicle speed range.

16. An antiskid control system as recited in claim 15, wherein said means for maintaining said reference cycle duration constant includes:
   (a) said first shift register receiving said pulse count from said counter after termination of each cycle of said pulse signal;
   (b) a decoder subject to the pulse count registered by said first shift register each cycle of said pulse signal for assigning a value to the contents of said first shift register; and
   (c) timing means subject to said decoder for establishing a time interval according to the assigned value of said first shift register by said decoder, during which time interval said reference cycle duration remains unchanged.

17. An antiskid control system as recited in claim 16, wherein said means for maintaining said reference cycle duration constant further comprises means for nullifying operation of said timing means in response to the presence of said control signals.

18. An antiskid control system as recited in claim 12, wherein said means for establishing a reference cycle duration further comprises a third shift register, said second shift register having at least one output providing a first reference cycle duration corresponding to the rotational speed of the wheel associated with said sensor and said third shift register having at least one output providing a second reference cycle duration corresponding to the vehicle speed.

19. An antiskid control system as recited in claim 18, wherein said means for comparing the outputs of said first and second shift registers further compares the outputs of said first and third shift registers to provide said difference signal at said first output thereof.

* * * * *